(12) United States Patent
Kanno et al.

(10) Patent No.: US 6,693,727 B1
(45) Date of Patent: Feb. 17, 2004

(54) IMAGE PROCESSING APPARATUS FOR PERFORMING HIGH-SPEED ERROR DIFFUSION

(75) Inventors: Hiroki Kanno, Yokohama (JP); Gururaj Rao, Yokohama (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/615,489

(22) Filed: Nov. 17, 1999

(30) Foreign Application Priority Data

Nov. 17, 1998 (JP) ............................................. 10-326961

(51) Int. Cl.⁷ ..................... H04N 1/403; H04N 1/405; G06T 5/00
(52) U.S. Cl. ..................... 358/3.03; 358/3.04; 358/3.05; 382/252; 382/304
(58) Field of Search ........................ 358/3.03, 3.04, 358/3.05, 1.9, 465, 466, 3.06, 3.23; 382/252, 304, 237

(56) References Cited

U.S. PATENT DOCUMENTS

| | | | |
|---|---|---|---|
| 4,975,786 A | 12/1990 | Katayama et al. | 358/3.05 |
| 5,287,419 A * | 2/1994 | Sato et al. | 382/252 |
| 5,383,033 A | 1/1995 | Takahashi | 358/3.03 |
| 5,519,509 A | 5/1996 | Hikosaka et al. | 358/3.03 |
| 5,892,851 A | 4/1999 | Nguyen | 382/252 |
| 6,333,793 B1 * | 12/2001 | Kobayashi | 358/1.9 |

FOREIGN PATENT DOCUMENTS

| | | | |
|---|---|---|---|
| JP | 06284290 | 10/1994 | H04N/1/40 |
| JP | 08279903 | 10/1996 | H04N/1/403 |
| JP | 10023260 | 1/1998 | H04N/1/405 |
| JP | 10-79022 | 3/1998 | H04N/1/405 |
| JP | 10070656 | 3/1998 | H04N/1/403 |

* cited by examiner

*Primary Examiner*—Scott Rogers
(74) *Attorney, Agent, or Firm*—Foley & Lardner

(57) ABSTRACT

An image processing apparatus includes an error correcting section for correcting an input image on the basis of a supplied error correction amount and outputting a corrected image, a threshold processing section for processing the corrected image on the basis of a predetermined threshold, further processing the corrected image on the basis of the error correction amount, and outputting an output signal, a correction amount calculating section for calculating in advance a plurality of correction amounts corresponding to possible values of the output signal in parallel with processing of the threshold processing section on the basis of the corrected image output from the error correcting section, and selecting one of the plurality of error correction amounts as the error correction amount in accordance with the value of the output signal actually output from the threshold processing section, and an error correction amount supplying section for supplying the error correction amount calculated and selected by the correction amount calculating section to the error correcting section and the threshold processing section, and diffusing an error of the image to surrounding pixels.

12 Claims, 5 Drawing Sheets

● → TARGET PIXEL
A~D → SURROUNDING PIXELS
DIFFUSION COEFFICIENT FOR PIXEL kA=(7/16)
DIFFUSION COEFFICIENT FOR PIXEL kB=(1/16)
DIFFUSION COEFFICIENT FOR PIXEL kC=(5/16)
DIFFUSION COEFFICIENT FOR PIXEL kD=(3/16)

IMAGE PROCESSING APPARATUS FOR PERFORMING HIGH-SPEED ERROR DIFFUSION

BACKGROUND OF THE INVENTION

The present invention relates to an image processing apparatus for processing an image input by error diffusion or the like.

In general, a text image processing apparatus capable of processing both bit information and image information simply binarizes, in accordance with a fixed threshold, contrast image information such as a character and line drawing on an original read by a reader unit such a scanner. This apparatus binarizes continuous tone image information such as a photograph by a pseudo-halftoning section according to dithering or the like, and outputs the binary information to, e.g., a binary printer having a small number of gray levels.

When read image information is simply binarized in accordance with a fixed threshold, the resolution of a character/line image region is preserved and the image quality does not suffer. However, the resolution of a photographic image region is not preserved, resulting in a low-quality image. When read image information is gradated by ordered dithering or the like, the resolution of a photographic image region is preserved and the image quality does not suffer. However, the resolution of a character/line image region decreases, resulting in a low-quality image. That is, only one binarization processing for read image information cannot simultaneously satisfy the image qualities of regions having different features.

As a binarization/multivalued scheme which satisfies the tone of a photographic image region and attains a higher resolution even for a character/line image region than ordered dithering, an "error diffusion method" is proposed. According to the "error diffusion method" (reference: An Adaptive Algorithm for Spatial Grayscale, by R. W. Floyd and L. Steinberg, Proceedings of the S.I.D. Vol. 17-2, pp. 75–77, Second Quarter 1976), a value obtained by multiplying a binarizing error of a binarized surrounding pixel by a given weighting coefficient is added to the density of a target pixel, and the target pixel is binarized in accordance with a fixed threshold.

FIG. 3 is a block diagram showing general binarization processing using the "error diffusion method". In FIG. 3, an input image signal 2-1 is input to a section 2-2 for correcting an error from a preceding line (preceding line error) that corrects image information of a target pixel in accordance with a correction amount 2-17 diffused from the preceding line. An image signal 2-3 corrected in accordance with the preceding line error is input to a section 2-4 for correcting a pixel diffused from a preceding pixel. A corrected image signal 2-5 is input to a binarizing section (thresholding process) 2-6 for binarizing the corrected image information of the target pixel while comparing it with a threshold 2-7. A binarization image signal 2-8 is input to a binarizing error calculating section 2-9 for calculating a binarizing error of the target pixel on the basis of an output level 2-10 and the corrected image signal 2-5 depending on the binarization value. The binarizing error calculating section 2-9 outputs a binarizing error signal 2-11 to an error filtering section 2-12 for distributing the binarizing error calculated by the binarizing error calculating section 2-9 to surrounding pixels. The error filtering section 2-12 is made up of an error calculating section 2-13 for calculating an error to an adjacent pixel (adjacent pixel error), and error calculating section 2-14 for calculating an error to a next line (next line error).

An adjacent pixel error correction amount 2-15 is output to the section 2-4, and an error correction amount 2-16 to a next line is stored in an error buffer 2-18.

FIG. 4 is a circuit diagram showing an arrangement of a conventional binarizing circuit using the "error diffusion method". The input image signal 2-1 read by an input device such as a scanner is corrected by the section 2-2 in accordance with an image correcting signal 2-17, and output as the error-corrected image signal 2-3. The error-corrected image signal 2-3 corrected in accordance with the preceding line error correction amount is corrected by the section 2-4 in accordance with the preceding pixel error correcting signal 2-15, and is output as the corrected image signal 2-5.

Upon receiving the corrected image signal 2-5, the binarizing section (comparator) 2-6 uses the corrected image signal 2-5 and a binarizing threshold Th (for example, "80h"; the suffix "h" means "hex" representing hexadecimal). The binarizing section 2-6 outputs "1" (black pixel) as the binarization image signal 2-8 if the corrected image signal 2-5 is larger than the binarizing threshold Th; otherwise it outputs "0" (white pixel).

The binarizing error calculating section 2-9 selects one output level 2-10 based on the binarization image signal 2-8 (i.e., selects an output level for 0 when the binarization image signal is "0", and an output level for 1 when the signal is "1"). The binarizing error calculating section 2-9 calculates the difference between this output level and the corrected image signal 2-5, and outputs the difference as the binarizing error signal 2-11.

The error filtering section 2-12 has an error filter arrangement shown in FIG. 5. In FIG. 5, "●" indicates a target pixel position. The error filtering section 2-12 calculates weighting errors obtained by multiplying the binarizing error signal 2-11 by weighting coefficients kA, kB, kC, and kD (where kA=7/16, kB=1/16, kC=5/16, and kD=3/16). In other words, the error filtering section 2-12 multiplies the binarizing error of the target pixel by the weighting coefficients kA, kB, kC, and kD to calculate weighting errors to four pixels (pixels corresponding to the positions of the weighting coefficients kA, kB, kC, and kD) surrounding the target pixel.

The error correction amount 2-15 to the adjacent pixel in the main scanning direction is calculated by the error calculating section 2-13 in accordance with the coefficient kA and binarizing error signal 2-11. The error correction amount 2-15 is supplied from a delay element 2-19 to the correcting section 2-4 in response to a next processing clock. Similarly, the next line error correction amount 2-16 is calculated by the error calculating sections 2-14, and delay elements 2-20, 2-21, and 2-22 in accordance with the binarizing error signal 2-11 and filter coefficients kB, kC, and kD. The error buffer 2-18 temporarily stores the error correction amount 2-16 in addition to the sum of weighting errors eB, eC, and eD for three pixels from the preceding line. In this scheme, the following condition must be satisfied to diffuse all errors:

kA+kB+kC+kD=1

Recently even in error diffusion processing for an output device having a large number of gray levels (level number), the above-described binarizing section is replaced with a multivalued section using a number of thresholds corresponding to the number of gray levels.

According to the "error diffusion processing", an error generated by binarization/multivalued processing for a target pixel is diffused to surrounding pixels to correct the error, thereby minimizing the binarizing/multivalued error. One problem of this method is that texture (regular pattern) appears on an output image (particularly upon binarization processing).

Another method using a mask and AND instead of coefficients is also proposed. This is a high-speed method of reducing texture by a synergistic effect with variation noise of a scanner.

FIG. 6 shows a bit mask error diffusion method in detail. The bit mask error diffusion arrangement is the same as the conventional error diffusion arrangement shown in FIG. 4 except for the error filtering scheme.

Masks mA, mB, mC, and mD shown in FIG. 7 replace the coefficients kA, kB, kC, and kD, and filtering using logic calculation of a mask and error replaces filtering using multiplication of a coefficient and error. According to the filtering scheme in FIG. 6, the AND of the absolute value of a binarizing error and the mask is calculated as an error to be distributed, and is assigned a binarizing error code.

In this scheme, assuming that the maximum error is 255, the following condition must be satisfied to diffuse all errors:

mA+mB+mC+mD=255

Further, the following scheme is proposed. To increase the multivalued error diffusion speed, an error of a preceding line is corrected in advance, and then threshold processing is performed. Threshold errors are added, and the sum is added to an error from a preceding pixel (preceding pixel error). The sum range is calculated, and an output and error are corrected based on this range, thereby increasing the diffusion speed.

In this scheme, calculation of the error range and error correction must be completed within one pixel clock. Therefore, this scheme is effective to a certain degree for a multivalued error having a small number of bits. However, calculation of the range and error correction take a long time for a binarizing error.

The above-described methods are also variously devised in terms of tone reproduction. In any method, however, the processing speed is limited by a feedback type algorithm arrangement.

As described above, calculation of the error range and correction must be completed within one pixel clock. The scheme is effective to a certain degree for a multivalued error having a small number of bits. However, calculation of the range and error correction take a long time for a binarizing error. The processing speed is limited by a feedback type algorithm arrangement, failing to achieve high-speed processing.

BRIEF SUMMARY OF THE INVENTION

It is an object of the present invention to provide an image processing apparatus capable of performing error diffusion processing for an input image at a high speed.

To achieve the above objects, according to the present invention, there is provided an image processing apparatus comprising: error correcting means for correcting an input image on the basis of a supplied error correction amount and outputting a corrected image; threshold processing means for processing the corrected image output from the error correcting means on the basis of a predetermined threshold, further processing the corrected image on the basis of the error correction amount, and outputting an output signal; correction amount calculating means for calculating in advance a plurality of correction amounts corresponding to possible values of the output signal in parallel with processing of the threshold processing means on the basis of the corrected image output from the error correcting means, and selecting one of the plurality of error correction amounts as the error correction amount in accordance with a value of the output signal actually output from the threshold processing means; and error correction amount supplying means for supplying the error correction amount calculated and selected by the correction amount calculating means to the error correcting means and the threshold processing means, and diffusing an error of the image to surrounding pixels.

As described above, the present invention does not wait for the result of the threshold processing section so as to calculate the error amount using the result, unlike the conventional error diffusion apparatus. The present invention performs error calculation processing for output values "0" and "1" (binary signal) in parallel with processing of the threshold processing section, and obtains calculation results for the two output values. The present invention selects one of the two calculation results in accordance with an output value from the threshold processing section.

Since the apparatus of the present invention executes the two processes in parallel, a time $(t_1+t_2)$ spent for threshold processing $(t_1)$ and calculation processing $(t_2)$ in the conventional apparatus can be shortened to $|t_1+t_2|$. As a result, higher-speed error diffusion processing can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described in detail below with reference to the several views of the accompanying drawing.

Figure 1:
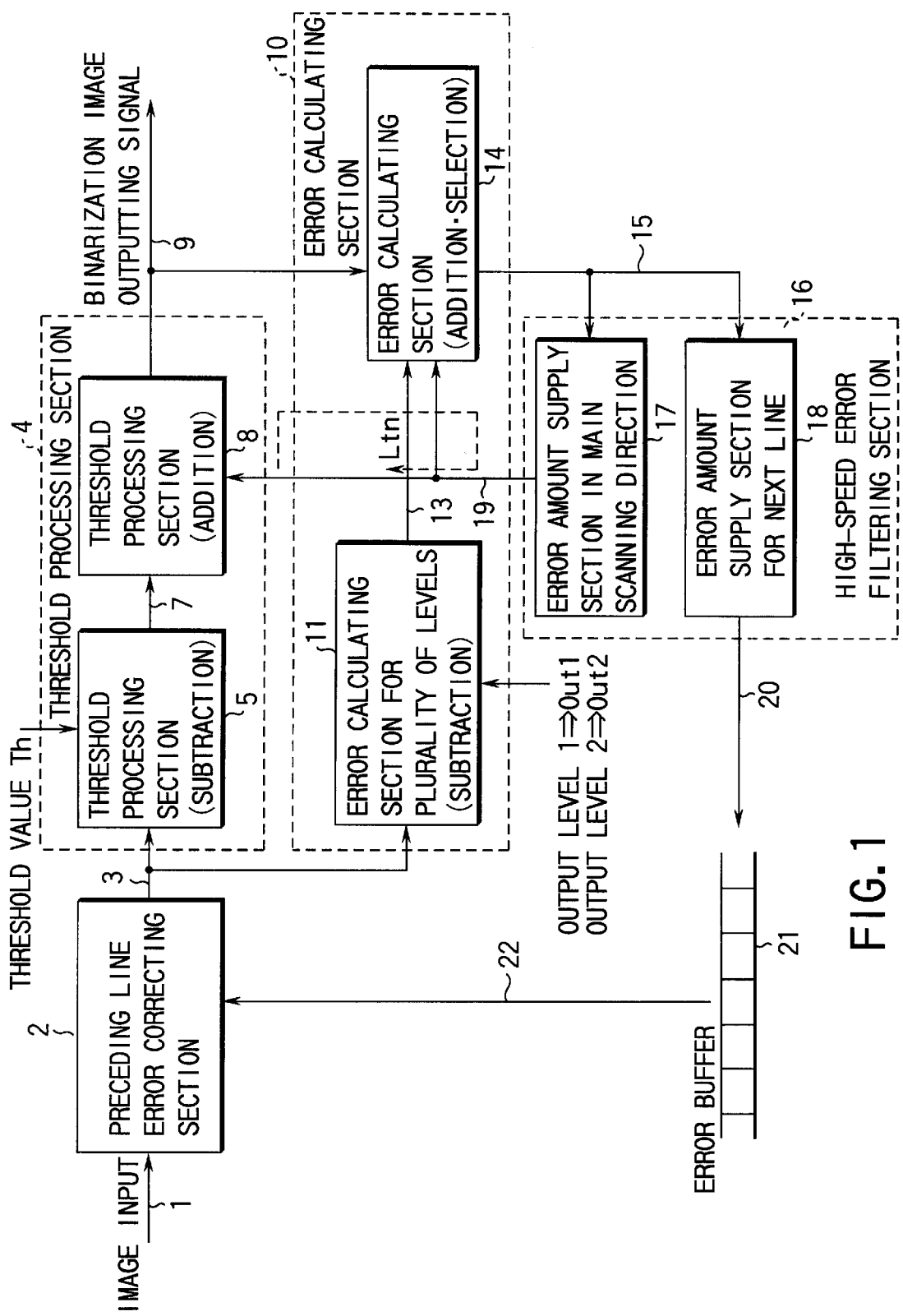
FIG. 1 is a block diagram showing the schematic arrangement of an image processing apparatus according to the present invention.

FIG. 1 shows the schematic arrangement of an image processing apparatus according to the present invention. More specifically, FIG. 1 shows an input image signal 1 to be supplied, error correcting section 2 for a preceding line that corrects image information of a target pixel in accordance with an error correction amount 22 diffused from the preceding line, corrected signal 3 corrected by the preceding line error, threshold processing section 4 which is made up of a threshold processing section (subtraction) 5 and threshold processing section (addition) 8 and performs threshold (binarization) processing, and binarization image outputting signal 9 to be output.

An error calculating section 10 is constituted by an error calculating section (subtraction) 11 for a plurality of levels, and error calculating section (addition & selection) 14. The error calculating section 10 calculates a binarizing error 15 from the corrected signal 3, the binarization image outputting signal 9, and a preceding pixel correction amount 19.

A high-speed error filtering section 16 filters the binarizing error 15 to surrounding pixels, and is comprised of an error calculating section (error amount supplying section) 17 for an adjacent pixel in the main scanning direction, and error calculating section (error amount supplying section) 18 for a next line.

A next line error 20 is temporarily stored in an error buffer 21. In processing a target pixel, the error buffer 21 supplies to the error correcting section 2 a corresponding error as the preceding line error correction amount 22.

Figure 3:
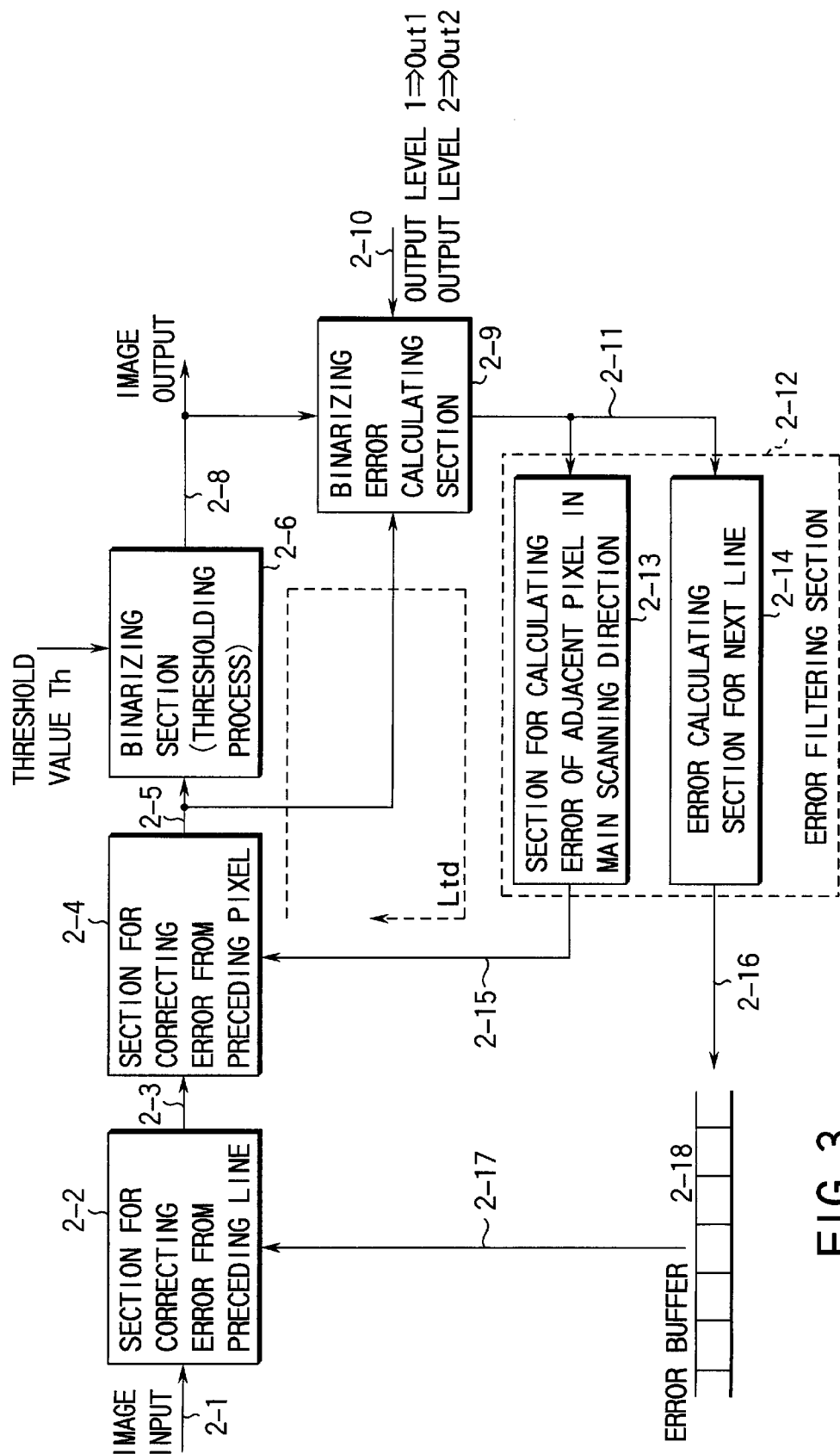
FIG. 3 is a block diagram showing an arrangement of a conventional error diffusion scheme.
Figure 4:
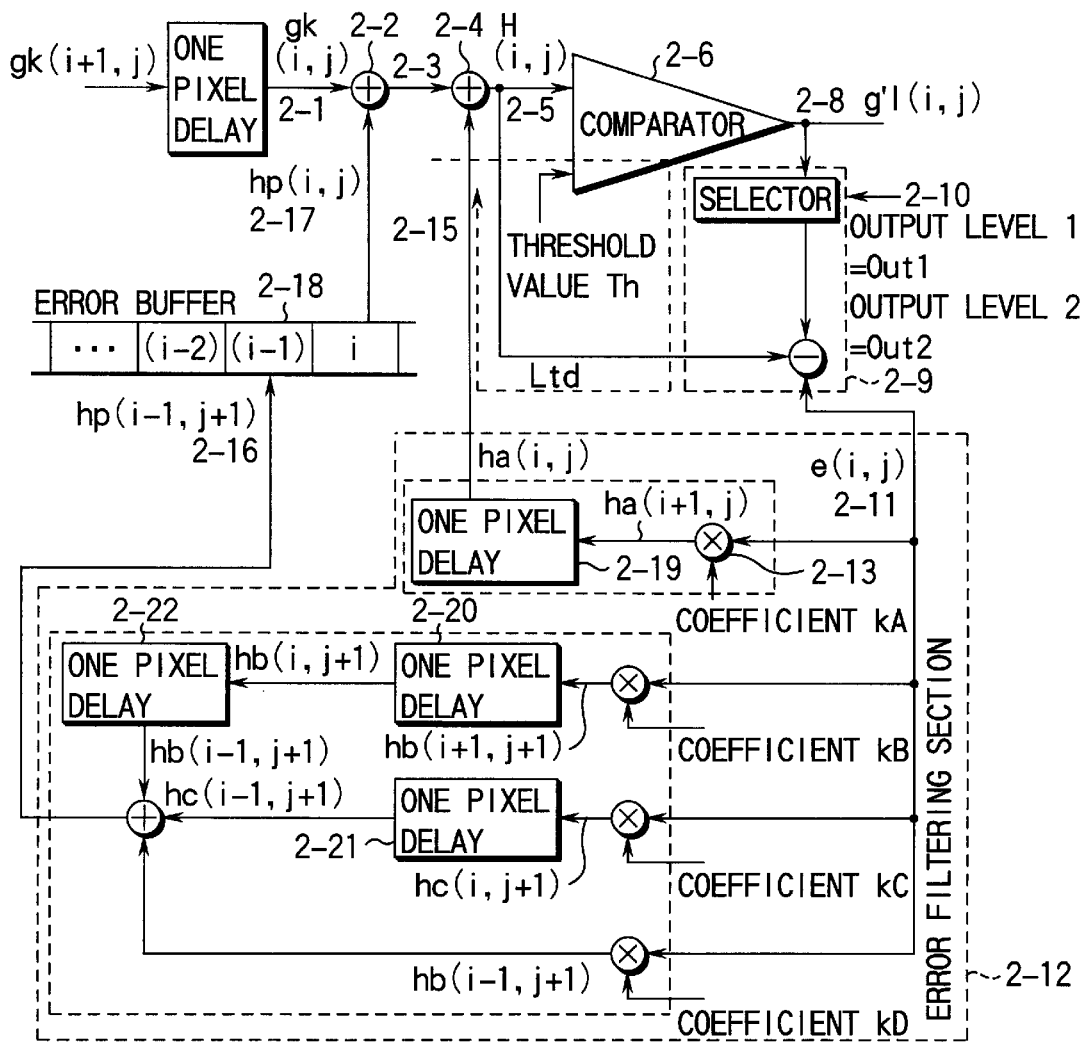
FIG. 4 is a circuit diagram showing an arrangement of the conventional binarizing scheme.
Figure 5:
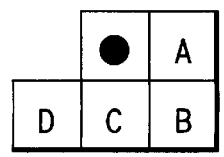
FIG. 5 is a view for explaining a filter used in the conventional error diffusion.
Figure 6:
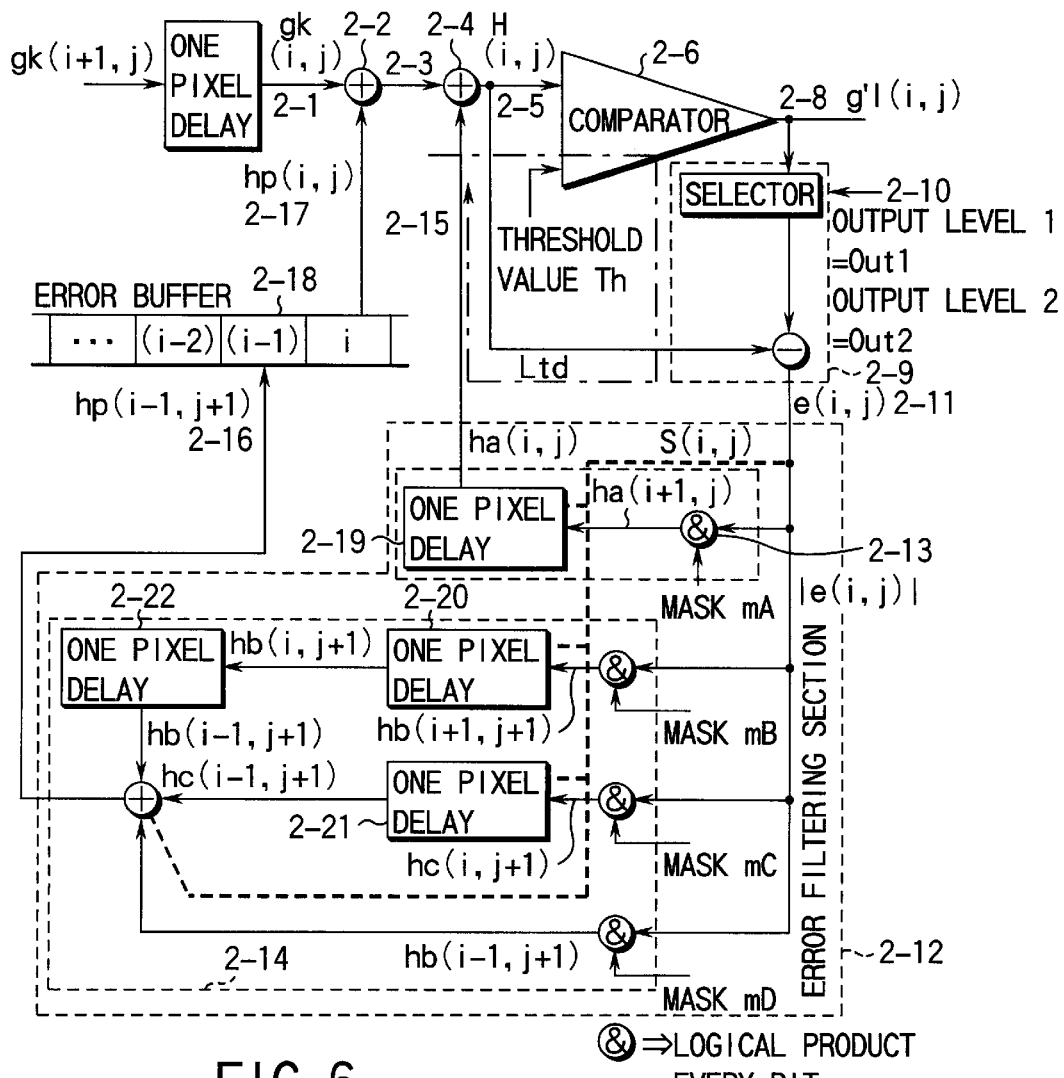
FIG. 6 is a circuit diagram showing an arrangement of a bit mask error diffusion scheme.
Figure 7:
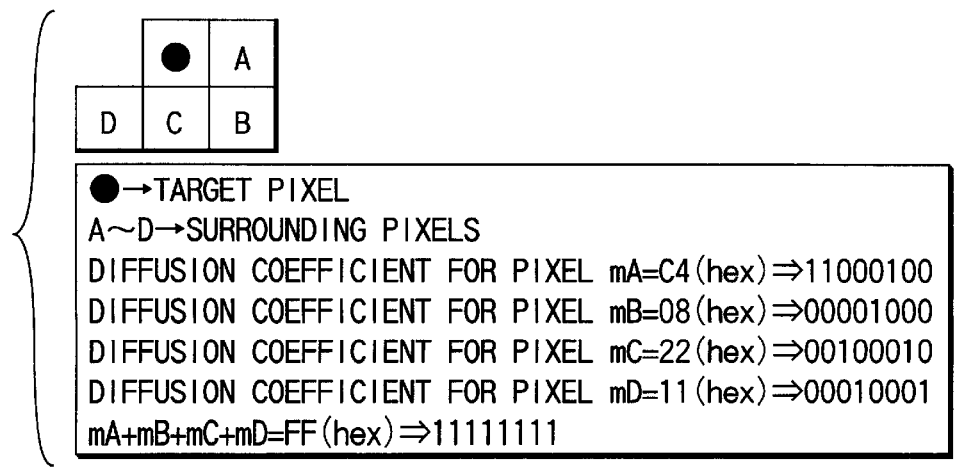
FIG. 7 is a view for explaining an error filter in the bit mask error diffusion scheme.

Compared to a feedback loop Ltd of the conventional error diffusion in FIG. 3, several processes in a feedback loop (Ltn) are executed outside the feedback loop (Ltn) in FIG. 1. This shortens the path of feedback processing performed within one clock. Thus, the arrangement of FIG. 1 can realize higher-speed processing than that of FIG. 3.

This embodiment will exemplify in detail an arrangement of partially executing threshold processing outside the loop, a method of calculating an error at a high speed by executing error calculation processing outside the loop, and a scheme of performing error filtering at a high speed by using two, positive and negative systems in bit mask error diffusion and selecting one of their results in accordance with an output result.

Figure 2:
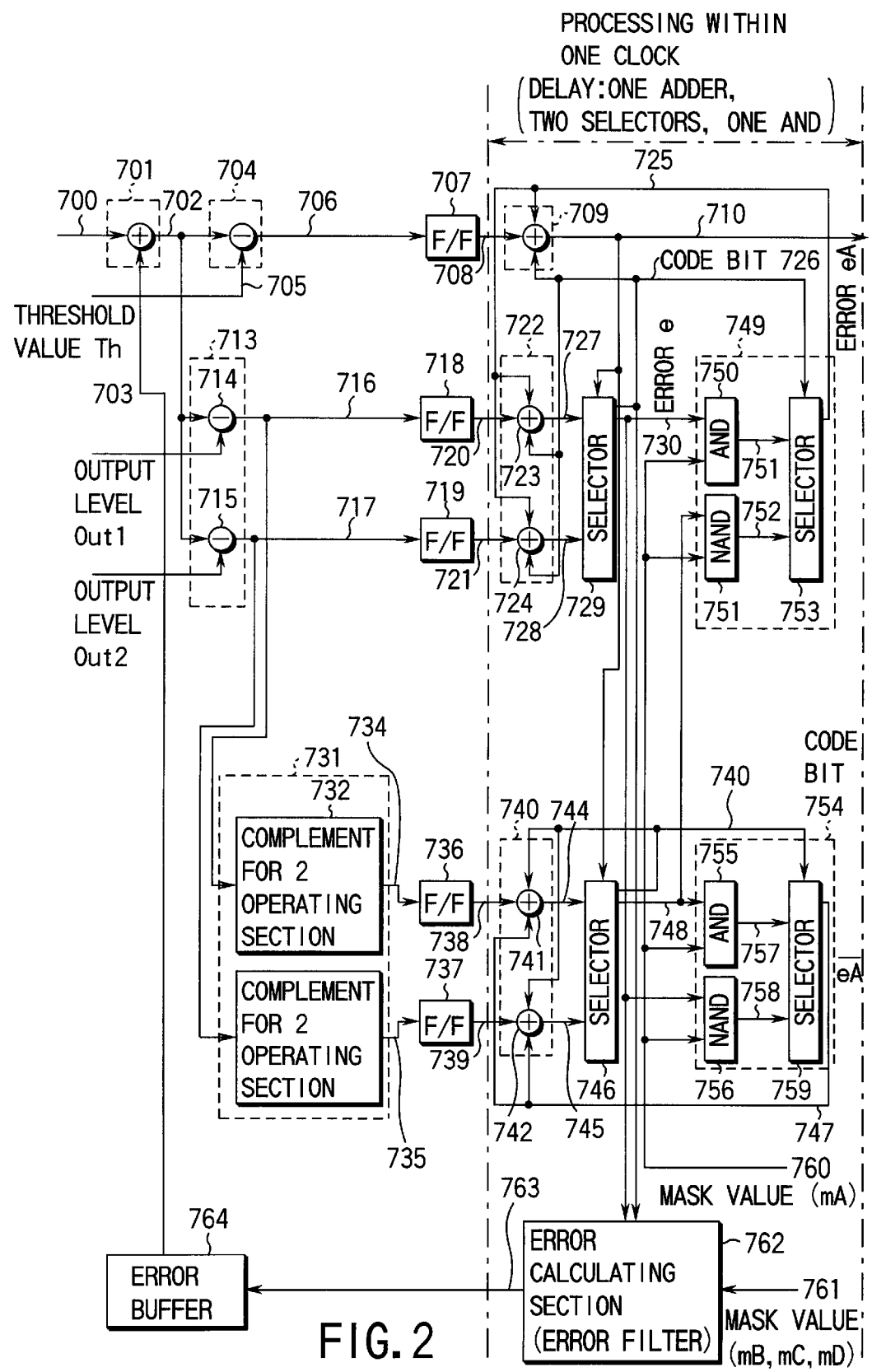
FIG. 2 is a circuit diagram showing a detailed arrangement of the image processing apparatus shown in FIG. 1.

FIG. 2 shows a detailed arrangement of the image processing apparatus shown in FIG. 1. In FIG. 2, the bit mask error diffusion speed is increased and the present invention can be similarly applied to the conventional error diffusion scheme.

In FIG. 2, an adder 701 corresponds to the error correcting section 2; a subtracter 704, to the threshold processing section 5; an adder 709, to the threshold processing section 8; an error calculating section 713 constituted by subtracters 714 and 715, to the error calculating section 11; an error filtering section 749 constituted by an adder 722 and selector 729, to the error calculating section 14.

The adder 701 adds an input pixel 700 and a preceding pixel error correction amount 703 supplied from an error buffer 764, and outputs a corrected signal 702.

As a method of executing threshold processing outside the loop to increase the processing speed, the subtracter 704 subtracts a threshold 705 from the corrected signal 702 in advance, and outputs an output signal 706. When feedback processing cannot be completed within one clock, a delay element (Flip-Flop; FF) 707 is interposed between the subtracter 704 and adder 709.

The adder 709 outputs a binarization output 710 using data 708 obtained by delaying the output signal 706 supplied from the subtracter 704 by the delay element 707, absolute value (e) 725 of a preceding pixel error, and sign bit 726. The adder 709 is a general full adder, and uses the sign bit 726 as a least significant bit carry. The sum becomes negative when a corrected pixel is smaller than the threshold, and positive when the pixel is equal to or larger than the threshold. Hence, when an output from the adder 709 is positive, the binarization output is 1, and when the output is negative, the output is 0. The adder 709 can output an inverted sign bit as the binarization output 710.

In the conventional scheme, as shown in FIG. 3, an error signal is calculated from an output level corresponding to the binarization output of a target pixel, and a corrected pixel value. For example, when the output is "0", an output level corresponding to the output "0", i.e., output level 1→Out1 is selected. When the output is "1", corresponding output level 2→Out2 is selected.

The difference between the selected output level and corrected pixel value is calculated as the error of the target pixel.

Error=(Corrected Pixel Value)−(Output Level)

To the contrary, in the high-speed scheme of the present invention, all possible levels (generally 0 and 1) are calculated by the error calculating section 713. That is, all possible output levels are subtracted in advance from an image signal corrected by a preceding line error correction amount, and all combinations of all possible errors are obtained.

For example, as shown in FIG. 2, the error calculating section 713 obtains combinations of possible errors for the corrected signal 702 corrected by a preceding line error, e.g., errors for output levels 1 and 2 for a binary signal.

The error calculating section 713 calculates some of errors for output level 1 using the subtracter 714 by subtraction of output level Out1 and the signal 702 corrected by a preceding line error. Then, the error calculating section 713 outputs an intermediate result 716. Similarly, the error calculating section 713 calculates some of errors for output level 2 using the subtracter 715 by subtraction of output level Out2 and the signal 702 corrected by the preceding line error. Then, the error calculating section 713 outputs an intermediate result 717. In other words, the error calculating section 713 calculates Partial Error 1 =

(Pixel Value After Error Correction From Preceding Line) −

(Output Level Out1)

Partial Error 2 =

(Pixel Value After Error Correction From Preceding Line) −

(Output Level Out2)

In this embodiment, a pixel having undergone error correction from preceding line is processed by the subtracter 704 and error calculating section 713. Alternatively, the pixel may be processed by the subtracter 704 before the adder 701, and subjected to error correction from preceding line. Similarly, the pixel may be processed by the error calculating section 713 before the adder 701 for the preceding line, and subjected to error correction from preceding line.

When feedback processing cannot be completed within one clock, delay elements (Flip-Flops; FFs) 718 and 719 are interposed between the error calculating section 713 and adder 722.

As described above, the error calculating section (addition & selection) 14 in FIG. 1 is made up of the adder 722 and selector 729. The error calculating section 17 serves as the adjacent pixel error filtering section 749, and the next line error calculating section 18 serves as an error calculating section (error filter) 762.

Partial errors 720 and 721 delayed by the delay elements 718 and 719 are corrected by adders 723 and 724 using the preceding pixel error correction amount 725 and sign bit 726, respectively. The adders 723 and 724 calculate an error 727 for output level Out1 and an error 728 for output level Out2, respectively. Similar to the adder 709, only the adders can obtain the following results using a sign bit for expressing all errors by a complement for 2:

Error 1=Partial Error 1+Preceding Pixel Error

Error 2=Partial Error 2+Preceding Pixel Error

The selector 729 selects an error corresponding to output level Out1, i.e., error 727 when the output level is 0, and an error corresponding to output level Out2, i.e., error 728 when the output level is 1. The selector 729 outputs the selected error as an error (e) 730 in the target pixel. Since all possible errors are calculated in advance, the error calculating section 14 shown in FIG. 1 can be shortened to the path of one selector.

The method of executing threshold processing outside the loop to shorten the feedback loop, i.e., increase the error calculation speed by parallel processing has been described.

Further, a high-speed error filter as another embodiment of the present invention will be described below.

In the error filter, the error correction amount for a next line is calculated by a conventional method because the calculation can be finished well before processing of a corresponding pixel ends (as shown in FIG. 2, an error for a next line 763 is calculated by an error calculating section 762 for a next line according to the conventional method using an error 730 and mask value (mB, mC, and mD) 761, and stored in an error buffer 764).

In this embodiment, the error correction amount for an adjacent pixel must be calculated. In the bit mask method, an error is calculated using the AND of the error and a mask value mA when the error is positive. When the error is negative, the absolute value of the error is obtained, the AND of the absolute value and mask value mA is calculated, and a sign is added to the AND again.

When the error (e) 730 is positive, a correction amount for an immediately adjacent pixel eA is given by eA=(e)&(mA)

where & is the AND for each bit.

When the error (e) 730 is negative, the correction amount eA is given by eA=−|e|&(mA)

where |e| is the absolute value of the error e. To obtain the correction amount eA, a complement for 2 must be calculated before/after filtering. This arrangement requires a long processing time. To prevent this, as shown in FIG. 2, an error filtering section 749 for an immediately adjacent pixel uses two circuit systems, simultaneously calculates both the positive error 730 and a negative error 748, and selects one of the errors 730 and 748 as an error (eA) 725 by an error sign bit 726. This decreases the number of stages for calculating a complement for 2.

To perform error filtering by the two systems, the negative error 748 must be obtained for the error 730. For this purpose, as shown in FIG. 2, complements 734 and 735 are respectively calculated by complement for 2 operating sections 732 and 733 of a circuit 731 from the partial errors 716 and 717, and delayed by delay elements (Flip-Flops; FFs) 736 and 737. Negative values 744 and 745 are calculated by adders 741 and 742 of a circuit 740 from delayed complements 738 and 739, preceding pixel error (inverted value eA) 747, and sign bit 743.

A selector 746 selects one of the two values as the negative value, i.e., error 748 of the error e 730.

A filtering section 754 calculates the inverted error (inverted value eA) 747 of the error (eA) 725. The filtering section 754 is composed of an AND circuit 755, NAND circuit 756, and selector 759.

In this way, calculation of a complement for 2 is eliminated from filtering, and high-speed filtering is realized using the two, positive and negative systems.

A conventional loop comprised of adders requires five stages. To the contrary, in this embodiment, the above arrangement can decrease the number of stages to four, i.e., one adder, two selectors, and one AND circuit. This realizes high-speed error diffusion.

As described above, the embodiment of the present invention can shorten the feedback path which inhibits an increase in speed in the conventional scheme, and can realize higher-speed error diffusion processing.

As has been described above in detail, the present invention can provide an image processing apparatus capable of processing an input image at a high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

error correcting means for correcting an input image on the basis of a supplied error correction amount and outputting a corrected image;

threshold processing means for processing the corrected image output from the error correcting means on the basis of a predetermined threshold, further processing the corrected image on the basis of the error correction amount, and outputting an output signal;

correction amount calculating means for calculating in advance a plurality of correction amounts corresponding to possible values of the output signal in parallel with processing of the threshold processing means on the basis of the corrected image output from the error correcting means, and selecting one of the plurality of error correction amounts as the error correction amount in accordance with a value of the output signal actually output from the threshold processing means; and error correction amount supplying means for supplying the error correction amount calculated and selected by the correction amount calculating means to the error correcting means and the threshold processing means, and diffusing an error of the image to surrounding pixels.

2. An image processing apparatus according to claim 1, wherein the threshold processing means includes means for subtracting the predetermined threshold from the corrected image output from the error correcting means, adding a difference value and the error correction amount, and outputting a resultant positive/negative sign as an output signal.

3. An image processing apparatus according to claim 1, wherein the correction amount calculating means includes means for subtracting the possible values of the output signal from the corrected image output from the error correcting means in parallel with processing of the threshold processing means to obtain a plurality of resultant values, adding the error correction amount to the plurality of resultant values, and selecting one of a plurality of sums in accordance with the value of the output signal output from the threshold processing means.

4. An image processing apparatus according to claim 1, wherein the error correcting means includes means for correcting the input image on the basis of an error correction amount representing an error amount of an image on a line preceding to the input image, and outputting the corrected image.

5. An image processing apparatus according to claim 1, wherein the threshold processing means includes threshold processing means for processing the corrected image output from the error correcting means on the basis of the predetermined threshold, adding an error of a pixel adjacent to the processed corrected pixel in a reverse direction of a main scanning direction, and outputting a positive/negative sign of a sum as the output signal.

6. An image processing apparatus according to claim 1, further comprising a flip-flop circuit interposed in processing of the correction amount calculating means in order to adjust a processing time.

7. An image processing apparatus according to claim 1, wherein the error correction amount supplying means includes means for appropriately processing, based on a supplied mask value, the error correction amount calculated and selected by the correction amount calculating means, and supplying the error correction amount to the error correcting means and the threshold processing means.

8. An image processing apparatus according to claim 1, wherein the error correction amount supplying means includes means for holding the error correction amount calculated and selected by the correction amount calculating means by an error buffer for a predetermined time, and supplying the error correction amount to the error correcting means.

9. An image processing apparatus according to claim 1, wherein the correction amount calculating means includes correction amount calculating means for simultaneously calculating both positive and negative errors, and selecting one of the positive and negative errors in accordance with a sign bit of the error, in parallel with correction amount calculation processing of calculating in advance a plurality of correction amounts corresponding to possible values of the output signal in parallel with processing of the threshold processing means on the basis of the corrected image output from the error correcting means, and selecting one of the plurality of error correction amounts as the error correction amount in accordance with a value of the output signal actually output from the threshold processing means.

10. An image processing apparatus comprising:

error correcting means for correcting an input image on the basis of a supplied error correction amount for a preceding line pixel and outputting a corrected image;

binarizing means for processing the corrected image output from the error correcting means on the basis of a predetermined threshold, binarizing the corrected image on the basis of an error correction amount for an adjacent pixel in a main scanning direction, and outputting a binarization signal;

correction amount calculating means for calculating in advance two correction amounts corresponding to possible values of 0 and 1 of the binarization signal in parallel with processing of the binarizing means on the basis of the corrected image output from the error correcting means, and selecting one of the two correction amounts as the error correction amount in accordance with a value of the binarization signal actually output from the binarizing means; and means for filtering the error correction amount calculated and selected by the correction amount calculating means, supplying to the binarizing means the error correction amount as the error correction amount for the adjacent pixel in the main scanning direction serving as an error amount of the input image to be diffused to the adjacent pixel in the main scanning direction, further filtering the error correction amount, and supplying to the error correcting means the error correction amount as the error correction amount for the preceding line pixel serving as an error amount of the input image to be diffused to a next line pixel.

11. An image processing apparatus comprising:

error correcting means for correcting an error of an image to be input on the basis of an error diffused from an input image;

threshold processing means for binarizing the image corrected by the error correcting means using a predetermined threshold;

error amount calculating/selecting means for calculating error amounts corresponding to all possible output levels in parallel with the threshold processing means, and selecting one of the calculated error amounts in accordance with a result of the threshold processing means; and error distributing means for distributing the error calculated and selected by the error calculating/selecting means to unprocessed surrounding pixels of the image.

12. An image processing method comprising the steps of:

error correcting step for correcting an input image on the basis of a supplied error correction amount and outputting a corrected image;

threshold processing step for processing the corrected image output from the error correcting step on the basis of a predetermined threshold, further processing the corrected image on the basis of the error correction amount, and outputting an output signal;

correction amount calculating step for calculating in advance a plurality of correction amounts corresponding to possible values of the output signal in parallel with processing of the threshold processing step on the basis of the corrected image output from the error correcting step, and selecting one of the plurality of error correction amounts as the error correction amount in accordance with a value of the output signal actually output from the threshold processing step; and error correction amount supplying step for supplying the error correction amount calculated and selected by the correction amount calculating step to the error correcting step and the threshold processing step, and diffusing an error of the image to surrounding pixels.

* * * * *